L. EMBREY.
APPARATUS FOR WORKING DOUGH.
APPLICATION FILED JUNE 1, 1915.
1,190,134.
Patented July 4, 1916.
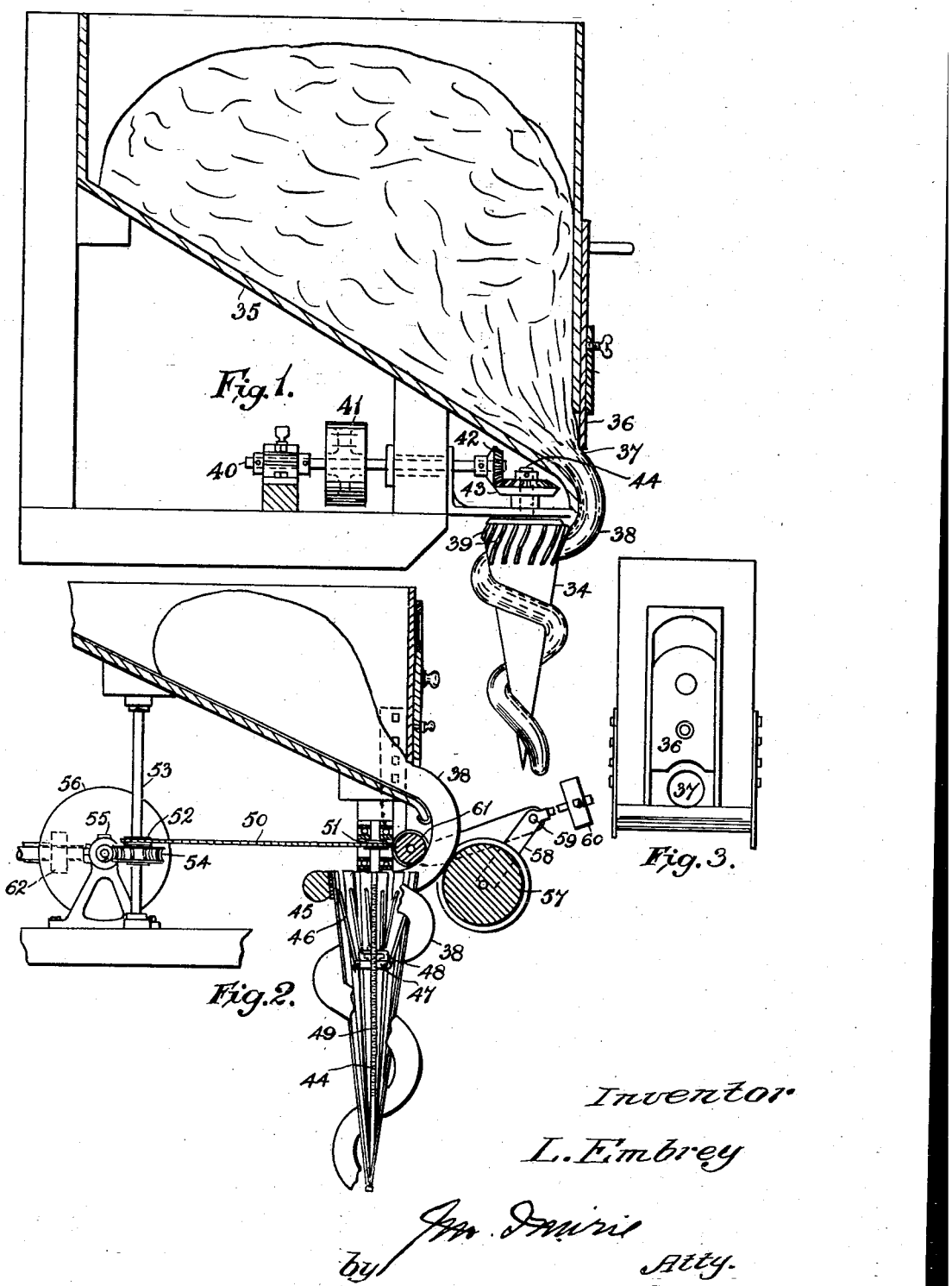
Inventor
L. Embrey
by Jno. Davis
Atty.

UNITED STATES PATENT OFFICE.

LAURENCE EMBREY, OF FENTON, STOKE-UPON-TRENT, ENGLAND.

APPARATUS FOR WORKING DOUGH.

1,190,134. Specification of Letters Patent. Patented July 4, 1916.

Original application filed February 19, 1914, Serial No. 819,809. Divided and this application filed June 1, 1915. Serial No. 31,635.

*To all whom it may concern:*

Be it known that I, LAURENCE EMBREY, a subject of the King of Great Britain, residing at Fenton, Stoke-upon-Trent, Staffordshire, England, have invented certain new and useful Improvements in Apparatus for Working Dough, of which the following is a specification.

This invention relates to a machine for performing on dough the operation known in some districts as cutting back. The exact nature of this operation is somewhat difficult to describe as it is one requiring considerable skill by the baker. After the operation of mixing and kneading, which are usually effected in a single machine, the dough is worked in portions so as to stretch the gluten and facilitate the operation of proving. In hand working, portions of dough are cut from the mass and pulled out and folded over by the baker. Although the sole purpose of this operation is to pull the dough, the operation has been named from the act of cutting off portions of dough, which can be readily worked by the baker.

The object of the present invention is to provide a machine which will work a mass of dough under continuous operation so as to stretch the gluten thereof and thus facilitate proving.

In my co-pending application Serial No. 819,809 filed 19th February, 1914, from which this application has been divided out, means are described for dealing with separate small pieces, in which the pieces are coiled on a spindle and then subsequently removed. This is the process known as molding, as the pieces duly tensioned are placed directly in tins, allowed to prove, and then baked.

It would be impossible to work large masses by coiling them on a single spindle as the inner portions would be overstretched so that the gluten would be ruptured. Such rupture of the gluten is to be avoided. According to this invention the rope or strip of dough is not retained on the spindle but passes on to the spindle or stretching member in the unstretched state and passes off in the stretched state. In other words, the rope or strip remains a rope or strip and the stretching is applied at an intermediate part in the length of the rope or strip. This enables a large mass of dough to be treated in the necessary gentle fashion to avoid any danger of rupturing the gluten.

The present invention consists in stretching the dough by a mechanical member which applies tension to the gluten of the dough without subsequent puckering. Where dough passes through rolls or the like over a table, the dough on the intake side of the roll is stretched but that on the out going side is puckered. To avoid this puckering I propose to tension the dough by causing it to be drawn around a rotating member. The process may if desired be continuous.

Referring to the accompanying drawings: Figure 1 illustrates somewhat diagrammatically in sectional side elevation, one form of a machine suitable for use in the operation of "cutting back," Fig. 2 being a similar view of a modification thereof. Fig. 3 is a front elevation of part of the hopper shown in Fig. 1.

As illustrated in Fig. 1, the stretching device may be in the form of an inverted cone or tapering spindle 34 arranged below the lower edge of the trough 35 from which the dough is to be discharged. The discharging end of the trough may have a shutter 36 regulating an opening 37 through which the dough may pass in the form of a strip or rope 38 of sufficiently reduced cross sectional area. This strip 38 or the like is then adapted to be caught by the rotating cone 34 and wound thereon. The cone 34 is rotated at a sufficiently reduced speed to allow a spiral of dough to be formed which will gradually work down the cone and fall into a second trough or on to any suitable conveyer or other device. The upper part of the cone may be provided with any suitable gripping surface such as projections 39 to insure an initial grip on the dough. The cone may be conveniently driven by a shaft 40, provided with a pulley 41, and with a bevel wheel 42 meshing with a bevel wheel 43 on the spindle 44 of the cone 34. The cone 34 may be made adjustable for instance, as illustrated in Fig. 2, it may be formed of a number of slats or ribs 45 pivoted at their lower ends to a central spindle 44, and adapted to be expanded or contracted relatively to the spindle by links 46 connected to a runner 47 carried by a nut 48 working on the screwed part 49 of the spindle.

By an apparatus such as above described, tension is applied to the whole of the gluten in the dough, that is to say, the tension is applied to the interior of the dough as well as the exterior. After the dough has been stretched by the winding spindle, cone or other equivalent device it may be passed on to an endless conveyer, if it is required to move it to a distance, and this conveyer may be arranged below the cone or immediately alongside the same, so that as the dough is partly wound on the winding device it passes off the same on to the conveyer.

In the form shown in Fig. 2 the spindle 44 is indicated as being rotated by a chain 50 driving a sprocket pinion 51 on the spindle and being driven in turn by a sprocket pinion 52 on a shaft 53 carrying a worm wheel 54 driven by a worm shaft 55. If desired a variable speed gear can be used to vary the speed of the cone. For instance, a friction disk 56 mounted on the worm shaft may be driven through the medium of a small wheel 62 adapted to be moved radially across the face of the disk 56 to vary the speed in the well known manner. The rope of dough 38 may be guided by a roller 57 on to the cone, the roller being carried by a lever 58 pivoted at 59 and provided with a counterweight 60. A guard roller 61 may prevent the dough winding on the spindle 44.

I wish it to be understood that I do not claim broadly the idea of stretching gluten by mechanical means, as attempts have been made to produce such stretching by means of rollers and conveyers. In the process of stretching herein described tension is applied to the mass all the time it is working its way along the cone. With a fairly good dough the amount of stretching effected may be 50% of the length, but of course I do not wish to limit myself to this figure. The thickness of the rope may be adjusted by adjusting the pressure of the balanced roller 57 and the degree of stretching is thus also determined to suit the quality of the dough. The dough should be stretched as much as it will safely stand without danger of breaking.

I wish it to be understood also that in stretching according to this invention there is not the same degree of maintenance of the tension as in my co-pending application Serial Number 819,809. In the operation of cutting back I wish merely to apply tension without subsequent puckering. The dough after stretching according to the method described does shrink back a little but a very considerable portion of the stretching remains as a permanent "set."

I claim:—

1. In an apparatus for working dough capable of being stretched, the combination of means for furthering the operation of proving, comprising means for forming a rope of said dough, and means located to act at an intermediate point of said rope of dough to coil the same, the coiling means operating faster than the rope forming means whereby the gluten of the dough is stretched.

2. In an apparatus for working dough capable of being stretched, the combination of means for furthering the operation of proving, comprising means for forming a rope of dough, and depending rotary means with which the dough engages to form a coil and to draw the rope of dough faster than the rope is formed, whereby to impart tension to the rope after same is formed to stretch the gluten in the dough.

3. An apparatus for treating dough capable of being stretched, comprising means for forming a rope of dough, a substantially vertical rotary member engaging said rope of dough while same is in a depending condition for coiling same to impart tension thereto, the coiling means operating faster than the rope forming means, whereby the gluten of the dough is stretched.

4. An apparatus for treating dough capable of being stretched, comprising means for forming a rope of dough, a substantially vertical conical member engaging said rope of dough while the latter is in a depending condition for coiling the rope of dough to impart tension to the gluten, and operating at such relative speed with respect to the rope forming means as to draw the rope of dough faster than said rope is formed by the rope forming means, whereby the gluten of the dough is stretched.

5. In an apparatus for working dough, the combination of a hopper having an inclined bottom and formed with an outlet opening through which dough passes to form a rope of said dough, means for controlling the opening, means located below the hopper to coil the rope of dough, said coiling means operating faster than the rope forming means, whereby the gluten of the dough is stretched.

6. Apparatus for treating dough capable of being stretched, comprising means for forming a rope of dough, a rotatable member engaging said rope of dough to pull the same and impart tension thereto, and adjustable means for varying the size of said rotatable member to vary the degree of stretch, substantially as described.

In testimony whereof I have signed my name to this specification in the presence of two subscribing witnesses.

LAURENCE EMBREY.

Witnesses:
MARY BEECH,
SAMUEL HOWE.